United States Patent [19]

Elder

[11] Patent Number: 5,715,782
[45] Date of Patent: Feb. 10, 1998

[54] COMPOSITE MOLDED BUTTERFLY VALVE FOR AN INTERNAL COMBUSTION ENGINE

[75] Inventor: Jack Edward Elder, Rochester, Mich.

[73] Assignee: Genral Motors Corporation, Detroit, Mich.

[21] Appl. No.: 703,150

[22] Filed: Aug. 29, 1996

[51] Int. Cl.⁶ .................................................. F02M 35/10
[52] U.S. Cl. ........................... 123/184.61; 123/337
[58] Field of Search ........................ 123/184.34, 337, 123/184.53, 184.61, 403

[56] References Cited

U.S. PATENT DOCUMENTS

| | | | |
|---|---|---|---|
| 4,907,547 | 3/1990 | Daly | 123/184.53 |
| 4,930,461 | 6/1990 | McNamara | 123/184.61 |
| 5,081,972 | 1/1992 | Daly et al. | 123/337 |
| 5,150,669 | 9/1992 | Rush, II et al. | 123/184.53 |
| 5,298,215 | 3/1994 | Krause | 264/242 |
| 5,522,361 | 6/1996 | Pickman et al. | 123/337 |
| 5,630,386 | 5/1997 | Uchida | 123/184.34 |

*Primary Examiner*—David A. Okonsky
*Attorney, Agent, or Firm*—Karl F. Barr, Jr.

[57] ABSTRACT

A combustion air intake system for an internal combustion engine has an intake manifold which supplies intake air to the engine through pairs of differing length intake runners. A valve assembly is disposed between the intake runners and the engine and includes a molded composite housing having pairs of combustion air through passages which are in flow communication with associate pairs of intake manifold runners. An axially extending valve bore defines an axis through the valve housing and bisects the through passages. Molded integrally within the valve housing is a molded composite valve member having an axial valve shaft, disposed in the valve bore, and integral valve plates, disposed in predetermined through bores. The valve member is rotatable in the valve bore to open and close the valve plates for regulation of air flow through the predetermined through bores and associated intake runners.

7 Claims, 9 Drawing Sheets

COMPOSITE MOLDED BUTTERFLY VALVE FOR AN INTERNAL COMBUSTION ENGINE

TECHNICAL FIELD

The invention relates to intake systems for internal combustion engines.

BACKGROUND OF THE INVENTION

It is possible, with multicylinder internal combustion engines, to improve performance and efficiency by utilizing the combustion air intake manifold as a tuning device. The incoming combustion air mass, and resonant frequencies of the same, can be exploited through the design of the intake manifold so as to produce a desired engine torque at predetermined locations on the engine operating curve. Intake manifolds having a single runner length can generally provide optimal torque at one specific engine speed while engines having a plurality of air intake runners per cylinder, or having articulated runner lengths, offer performance increases at multiple points in the engine operating range.

Engines utilizing combustion air delivery systems having more than one runner per cylinder generally require a method of selectively valving out or turning off one of the runners at predetermined operating points of the engine. Heretofore, butterfly-type valves mounted on a rotatable shaft have been used to control air flow and consist primarily of a machined metallic housing which is installed between the intake manifold and the intake ports of the cylinder head. The housing includes combustion air passages which conduct air from the manifold to the engine intake ports and a rotatable shaft bisecting the air passages and extending the length of the housing for supporting multiple stamped and machined metallic blades. The blades are typically installed with fasteners such as screws and the shaft is supported, relative to the housing, with a series of bearing assemblies disposed therebetween. Valves of this type are difficult to assemble and are, by design, expensive. Clearances required to compensate for tolerance stack-up in the manufacturing and assembly of the valve ensures that close tolerances and fully sealing valves will not be possible. Additionally, because of the tolerance stack-up, there is port-to-port variation in the assembly which limits the emission calibration capabilities of the engine.

SUMMARY OF THE INVENTION

The present invention is directed to a valve assembly and its method of manufacture which, in a preferred embodiment, is installable between the intake runners of an internal combustion engine and the cylinder intake ports for regulation of combustion air flow to individual cylinders in cases where the individual cylinders are supplied with combustion air through multiple, varying length, intake runners. The valve assembly is of the rotary, butterfly valve type and includes a valve housing having a series of through-passages through which combustion air can flow from selected intake runners to associated intake ports of the engine cylinders. In a typical configuration, each engine cylinder is associated with two different length intake runners. During operation of the engine, one runner will remain fully open to the flow of combustion air while the other, secondary runner will be selectively opened and closed depending on performance requirements. In order to regulate the flow of combustion air through the secondary intake air runner, a single piece valve member is disposed in the valve housing and includes a molded composite shaft which extends the length of the housing, bisecting each of the through passages, having valve plates in each of the secondary through passages which are molded integrally to the rotatable shaft.

The valve assembly is constructed in substantially two basic molding operations. During the first molding operation, the composite valve housing is molded. Passages having desired flow enhancing surfaces, fuel injector sockets, sealing surfaces and an axially extending shaft opening are some of the features which result from this operation and are simplified by the use of a high strength composite which can be easily molded with no, or minimal, subsequent finishing steps required.

Following the molding of the valve housing, a second molding process forms the valve shaft and the valve plates. The valve shaft and integral plates are molded within the valve housing using the valve housing to form a portion of the molding die for this component. Using a different composite material allows the shaft and valve plates to be molded against the valve housing for precise fit, while assuring release of the valve shaft and plates as the material cools following molding. Integral molding of the valve shaft and plates virtually eliminates tolerance variation between the valves and the housing since shrinkage can be closely controlled. The result is a valve assembly having high sealing properties and consistent port-to-port leakage rates when the vanes are in the closed position.

These and other features and advantages of the present invention will become apparent by reference to the following description and to the drawings.

DESCRIPTION OF THE PREFERRED EMBODIMENT

Figure 1:
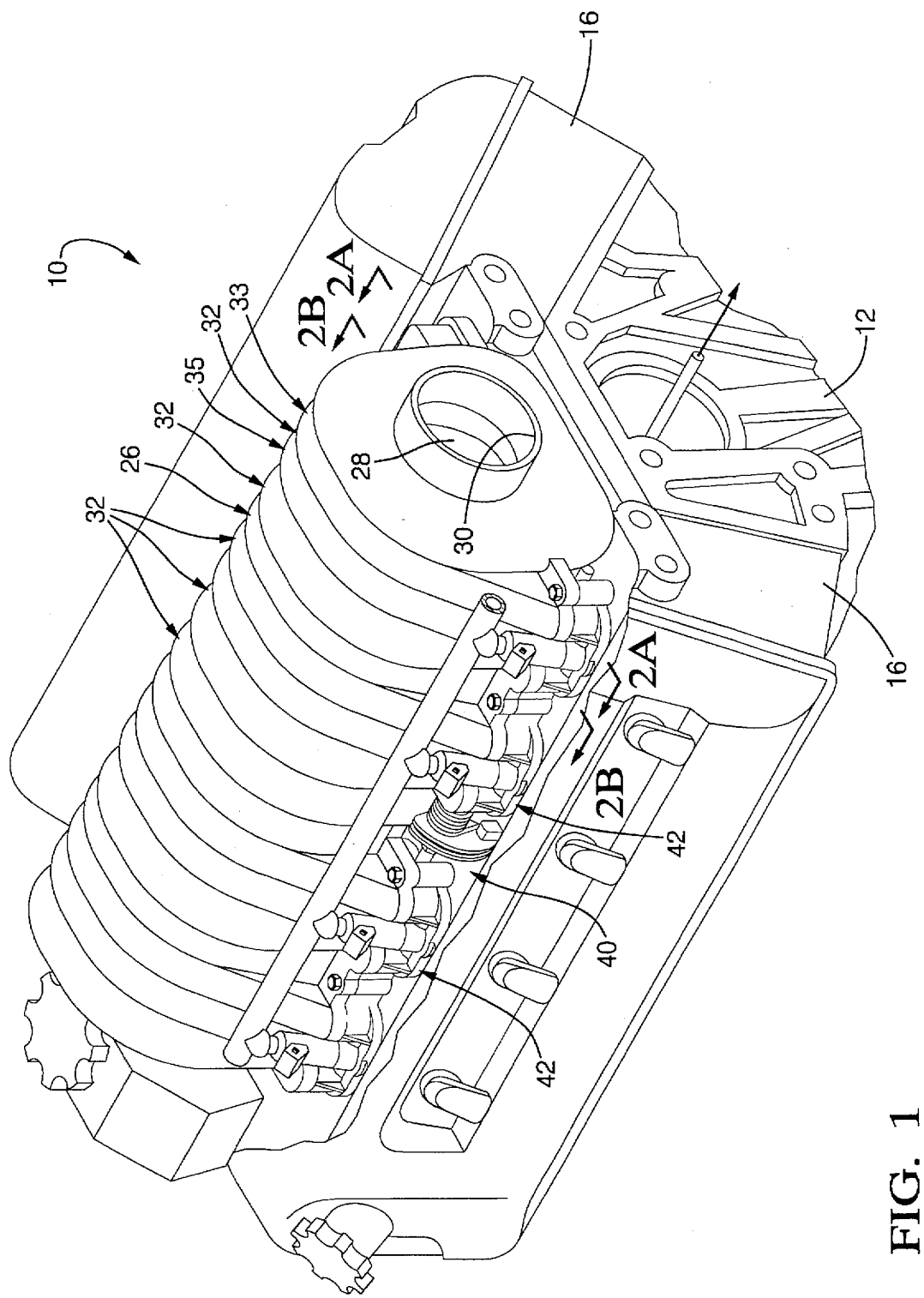
FIG. 1 is a partial perspective view of an internal combustion engine having an intake system which embodies features of the present invention.
Figure 2A:
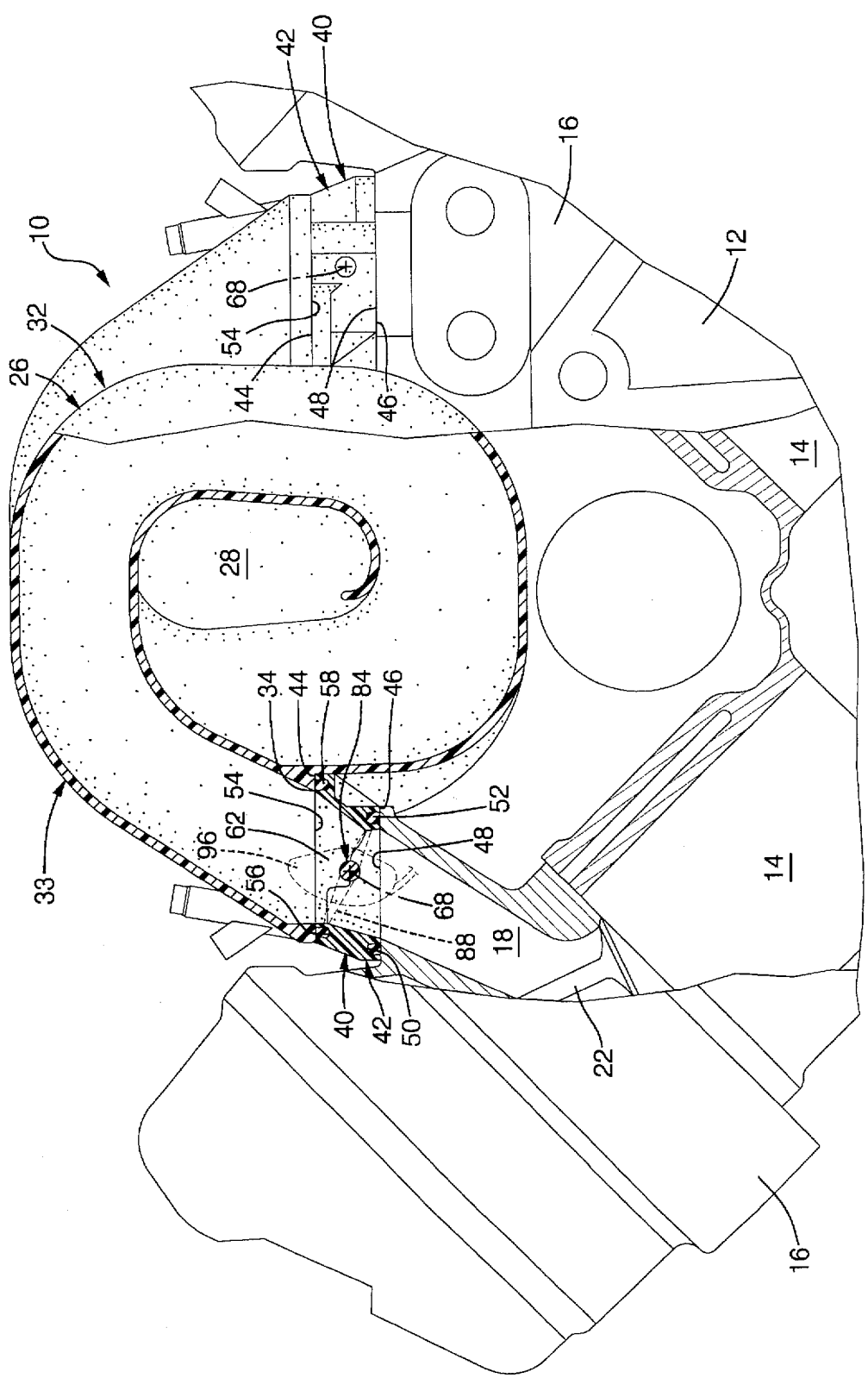
FIGS. 2A and 2B are sectional views of the engine of FIG. 1, taken along line 2A—2A and line 2B—2B respectively.
Figure 2B:
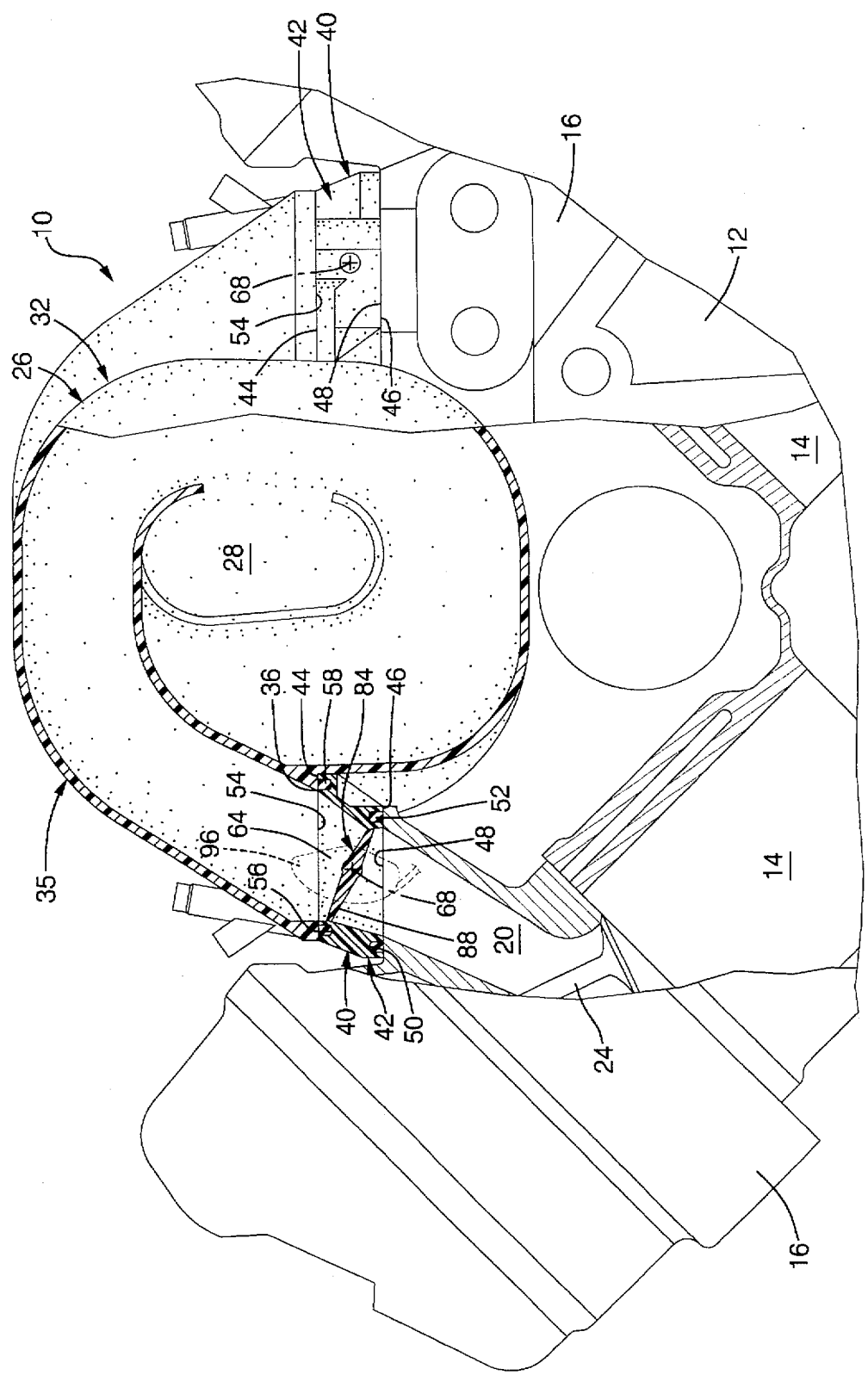

Referring to FIG. 1 there is illustrated an internal combustion engine, designated generally as 10, having a cylinder block assembly 12 housing a plurality of cylinders 14, FIGS. 2A and 2B, which are closed, to form combustion chambers, by a cylinder head 16 which is mounted to an upper surface of the cylinder block 12. Each cylinder 14 is supplied with combustion charge through a pair of intake ports 18 and 20, flow through which is controlled by a pair of poppet valves 22 and 24 which open into the combustion chambers to admit a metered quantity of fuel and air.

An intake manifold 26 has a longitudinally extending, centrally disposed passage 28 which receives inlet air through an opening 30. The opening 30 is typically connected to an intake system including air filtration and metering devices, not shown. Pairs 32 of intake runners, typically shown as 33 and 35, surround the outer perimeter of the intake manifold passage 28 and extend from the passage 28 to associated pair of outlet openings 34 and 36 which are axially disposed in spaced, array along the bottom side of the manifold 26. The openings 34 and 36 are in flow communication, as will be subsequently described, with the intake runners 18 and 20 so as to supply charge air to each of the engine cylinders 14. Each pair 32 of intake runners includes a primary runner 33 and a secondary runner 35. Each of the runners in a pair 32 has a specific length which is chosen to provide particular engine torque characteristics at certain points in the engine operating range. Typically, at lower engine speeds, a long intake runner, such as primary runner 33, will achieve the most desirable performance while at higher engine speed, a shorter intake manifold runner, such as secondary runner 35, is preferred.

In order that the lengths of the intake runners 33 and 35 of each intake runner pair 32 can be used to affect the performance of the engine it is required that each of the runners in a runner pair supply air to an associated engine cylinder 14 and, preferably, at least one of the runners in a pair be subject to flow control during the operation of the engine so that air flow can be turned on or off at desired operating points. Intake runner flow control is achieved in engine 10 through the use of a molded composite valve assembly 40, FIG. 3, which is mounted to the cylinder head 16 and operates as a mounting base for intake manifold 26. Operation of the valve assembly 40 limits the flow of intake air which can pass through at least one runner, preferably the secondary, high speed runner 35, of each pair 32 of intake runners allowing optimization of air flow entering the cylinders 14 based on engine speed operating conditions.

Referring now to FIGS. 3–8, the valve composite assembly 40 includes a base or housing member 42 which is molded from a suitable, high compression strength composite, thermoplastic, thermoset or metal composite material. Because of the valve placement between the intake manifold 26 and the cylinder head 16, and its use as a mount for the former, dimensional tolerance is critical, requiring uniform shrinkage of the material in all directions. A short glass or mineral reinforced material is therefore preferred. The housing 42 includes upper and lower sealing surfaces 44 and 46. The lower sealing surface 46 is configured to mate with a corresponding mounting surface 48 on the cylinder head 16 and may include integral seal grooves 50 which receive flexible polymeric sealing members 52 which operate to seal the cylinder head-valve assembly interface when the two components are assembled. Similarly, the upper sealing surface 44 mates with an associated mounting surface 54 of intake manifold 26 through which the associated pairs of outlet openings 34 and 36 open. The upper sealing surface 44 also may include integral seal grooves 56 which receive flexible polymeric sealing members 58 operable to establish a seal at the valve assembly-intake manifold interface when the intake manifold is assembled to the engine 10. As an added mechanism to control material shrinkage and maintain desired dimensional tolerances in the housing, it may be desirable to provide coring openings 60 in the housing walls to assist in controlling and maintaining uniform shrinkage of the composite material. The coring openings 60 may be located in housing walls having cross-sections which are thicker than adjacent walls which could lead to varying shrinkage rates during cooling or curing of the material following molding. Use of a composite, molded valve housing rather than a machined metallic member allows the integration of the seal grooves 50,56 into the upper and lower sealing surfaces 44 and 46 during the molding process, as well as the coring openings required to control material shrinkage, thereby saving handling cost and improving dimensional accuracy.

Figure 9A:
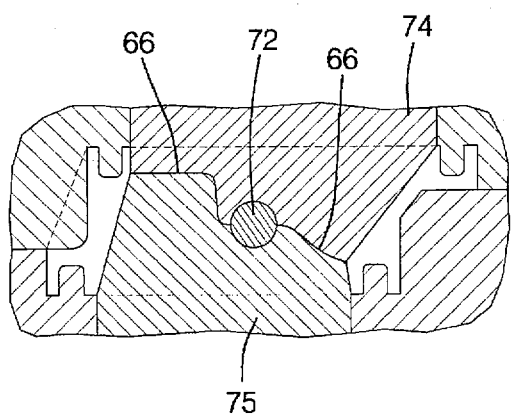
FIG. 9A is a schematic view of a die for molding the valve housing of the subject valve assembly.
Figure 9B:
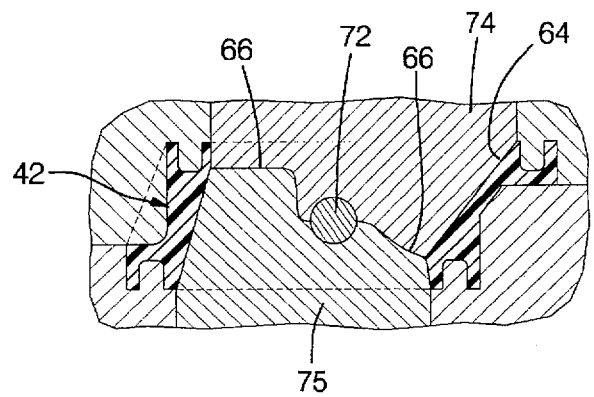
FIG. 9B shows the die of FIG. 9A following the molding of the valve housing of the subject valve assembly.

Opening through the housing 40 from upper surface 44 to lower surface 46 are pairs of through passages 62 and 64 which are configured to cooperate with associated pairs 32 of primary 33 and secondary 35 runners of the intake manifold 26 and pairs of intake ports 18 and 20 to conduct combustion air to associated engine cylinders 14. The through passages 62 and 64 are formed during the molding of the housing 40 and are preferably configured so that the paring lines 66 allow simplified die pulls, illustrated schematically in FIGS. 9A and 9B, while providing design flexibility to optimize air flow characteristics through the passages.

Figure 7:
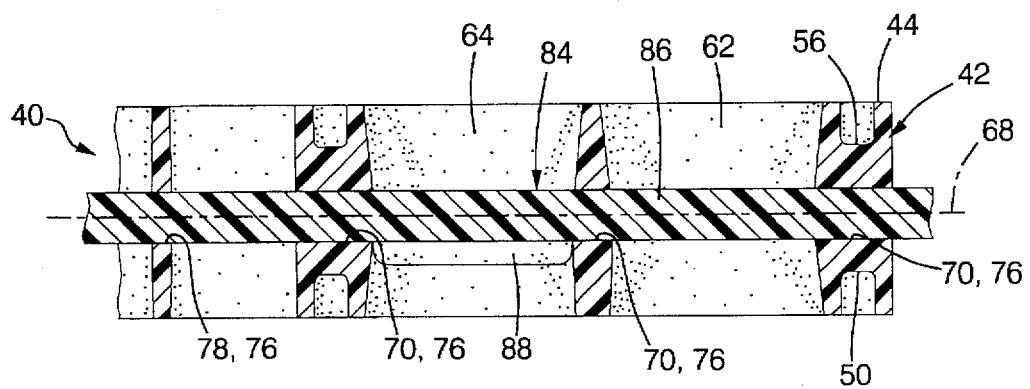
FIG. 7 is a partial sectional view through the valve assembly of FIG. 3, taken along line 7—7 of FIG. 6.
Figure 8:
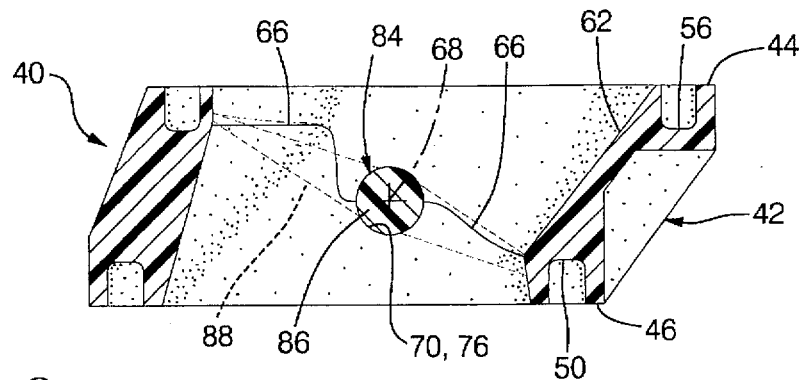
FIG. 8 is a sectional view of the valve assembly of FIG. 3 taken along line 8—8 of FIG. 6.

Extending longitudinally through the housing 40, defining an axis 68 which bisects each of the through passages 62,64, is a cylindrical valve shaft opening 70, FIG. 7. The opening 70 is formed during the molding of the valve housing 40 using die 72 which opens in a direction which is normal to dies 74 and 75 used to form through passages 62 and 64. The valve shaft opening 70 defines valve shaft bearing surfaces 76 in each of the housing walls as well as a centrally disposed shaft cradle 78 which supports the valve shaft at a location intermediate of the pair of through passages.

Figure 10A:
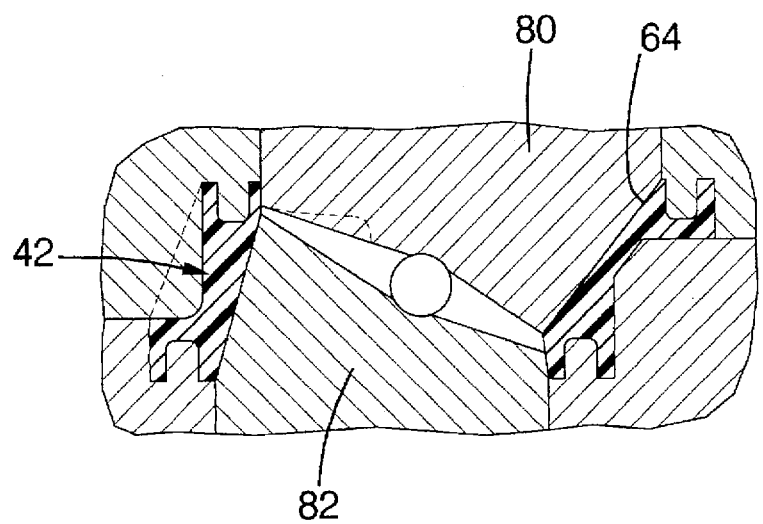
FIG. 10A is a schematic view of a die for molding the single piece composite valve set of the subject valve assembly.
Figure 10B:
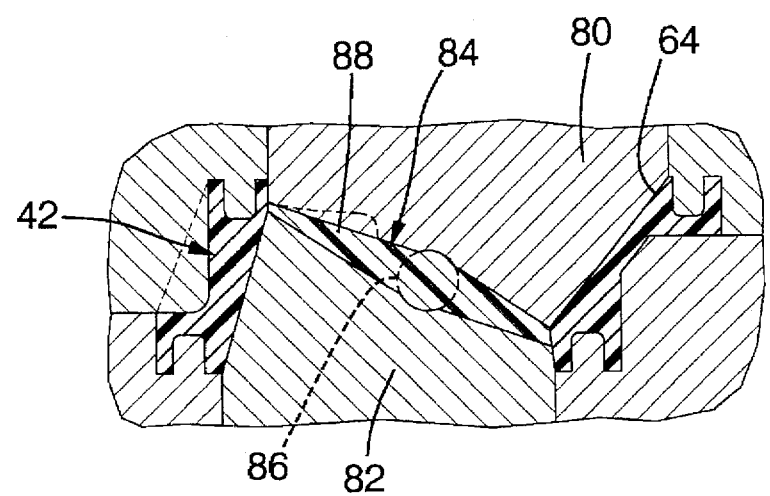
FIG. 10B shows the die of FIG. 10A following the molding of the single piece composite valve set of the subject valve assembly.

Following the molding of the valve housing 40 and the removal of the passage dies 74,75 and the valve shaft opening die 72 from the molding machine, new dies 80 and 82, FIGS. 10A, 10B, are inserted into the through passages 62 and 64 and a single piece, composite valve set 84 is molded in place within the valve housing 42. The valve set 84 includes an axially extending valve shaft 86, which extends through the valve shaft opening 70 such that it bisects the through passages 62 and 64, as well as valve blades 88 which are located in selected through passages, such as secondary passages 64 in the preferred embodiment illustrated. The valve shaft 86 and valve blades 88 utilize portions of the valve housing 42 as a molding die, FIG. 10B. By molding a second material, forming the valve set 84, against the housing 42, there is a uniform line to line fit between the housing and the blades 88. As the second material cools, following molding, it will shrink to form a slight, uniform gap or operating clearance around the perimeter of the blades 88 and between the valve shaft 86 and the bearing surfaces 76 in the housing walls. The uniform clearance provided by the molding method employed herein will inherently provide a valve seal which is superior to a traditional, multipiece butterfly valve thereby maximizing port-to-port flow symmetry with no variation due to build tolerance stack up. Molding of the valve plates 88, integrally with the valve shaft 86 and within the valve housing 42 also allows the configuration of the plates, FIGS. 5 and 6, to be maximized for aerodynamic efficiency. As an example, the downstream side of the valve blades 88, that is the side of the blade from which the combustion air flow departs, may be configured with an airfoil shape to minimize the disruption of the airflow as it passes over the valve blade The valve set 84 is preferably molded from a suitable high tensile and fatigue strength composite material which differs from that used to mold the valve housing. As with the base material, dimensional stability is desirable such that reinforcing material may be used to provide uniform shrinkage in all directions as well as dimensional stability with changes in ambient moisture.

Figure 3:
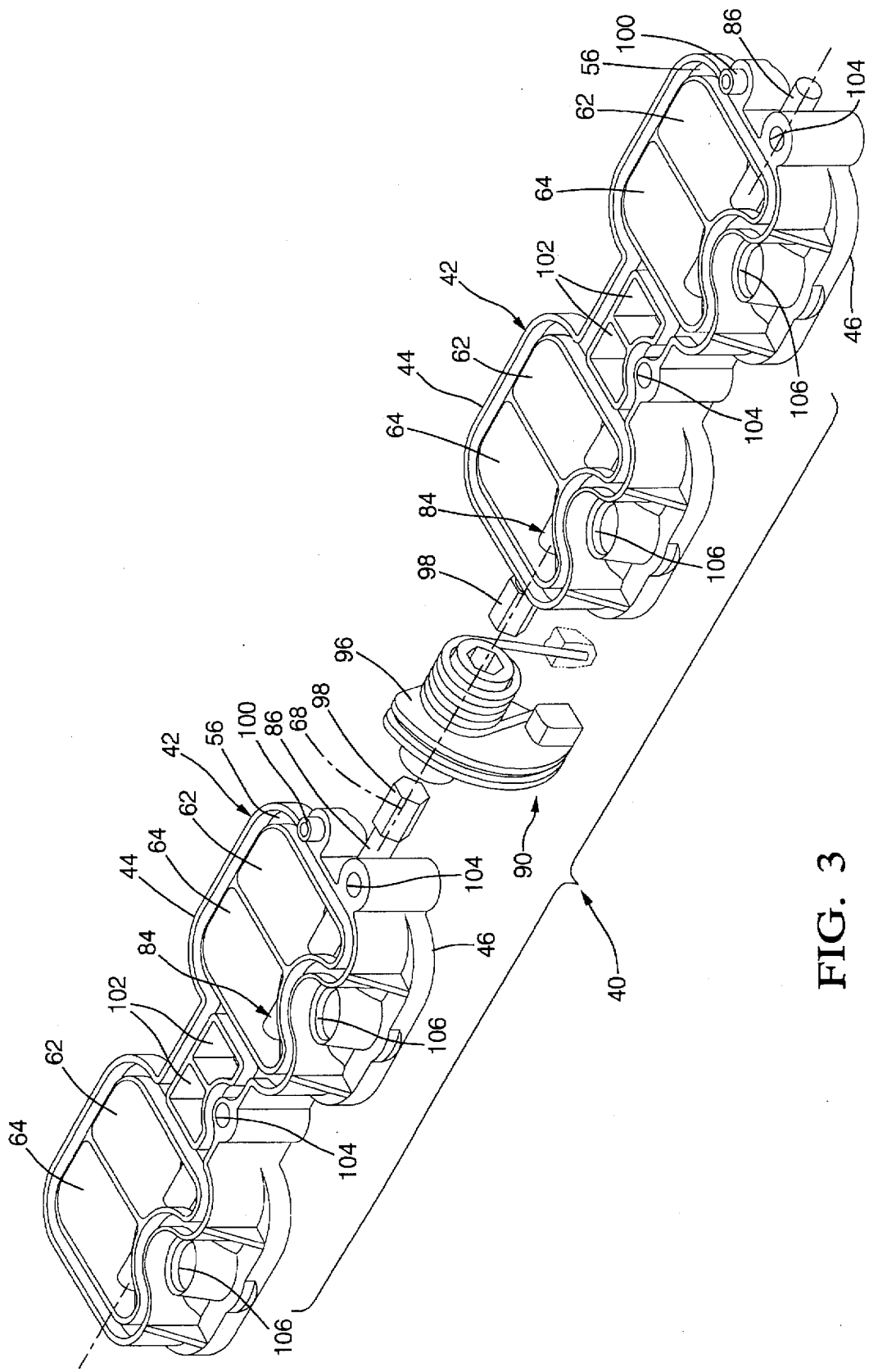
FIG. 3 is a partially disassembled, perspective view of a molded composite valve assembly embodying features of the present invention.
Figure 4:
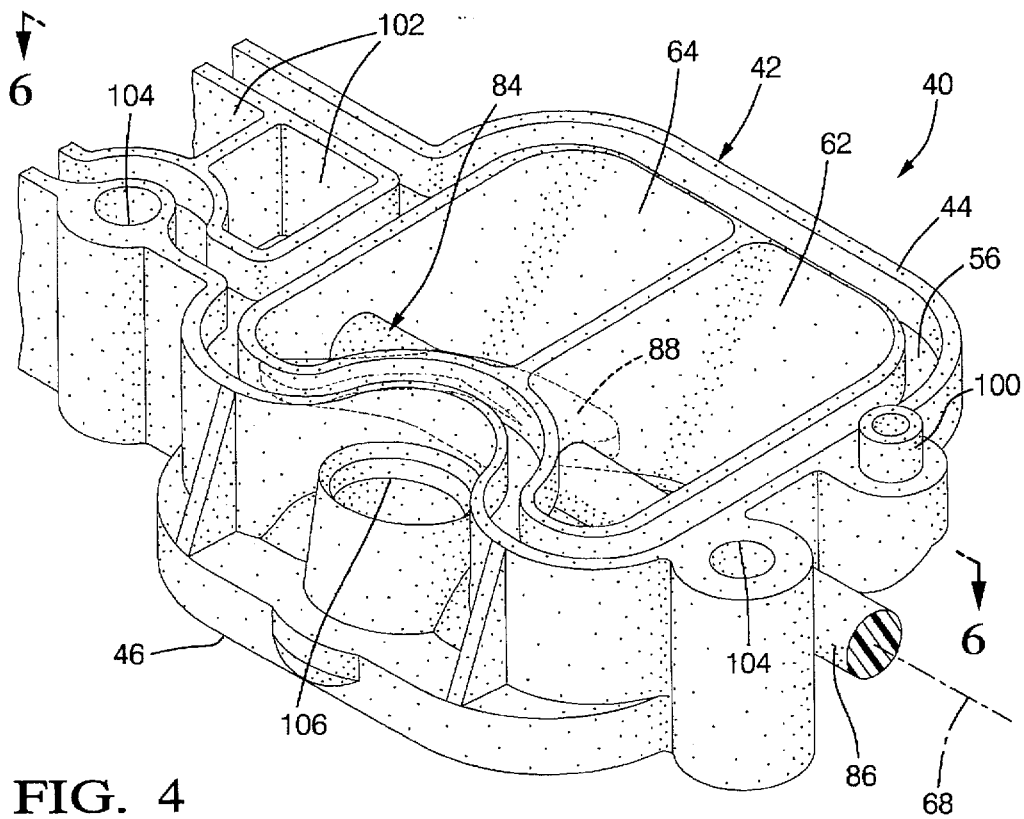
FIG. 4 is an enlarged portion of the valve assembly of FIG. 3 shown with the valve plate closed.
Figure 5:
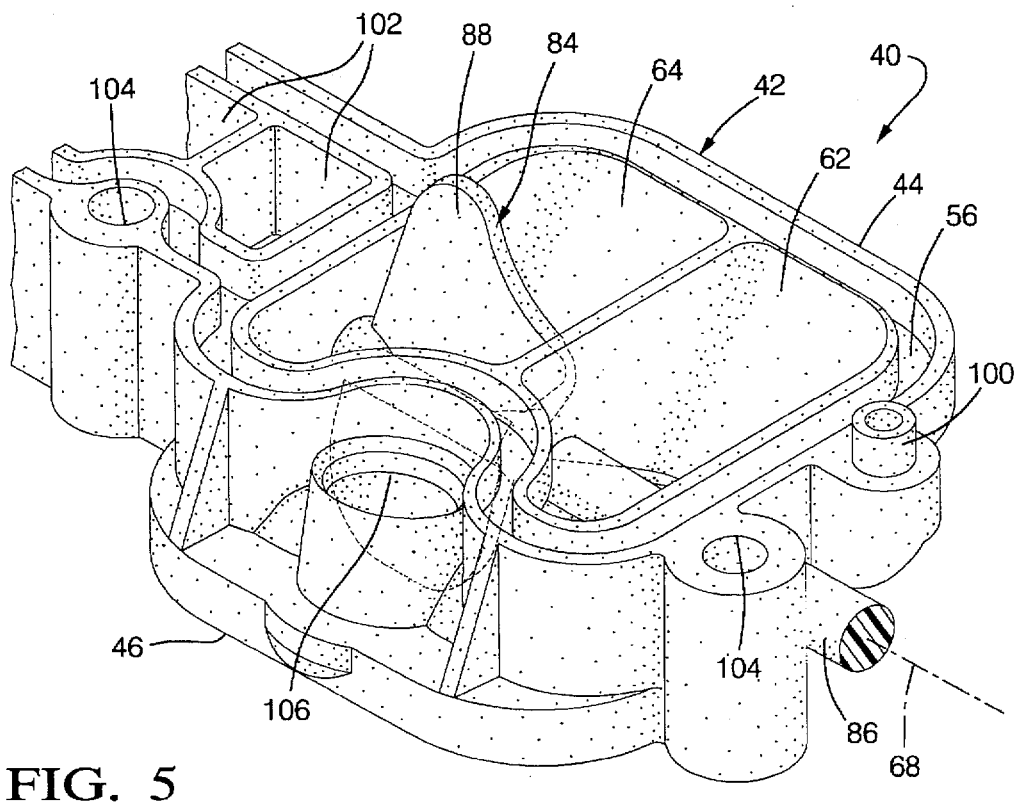
FIG. 5 is an enlarged portion of the valve assembly of FIG. 3 shown with the valve plate opened.
Figure 6:
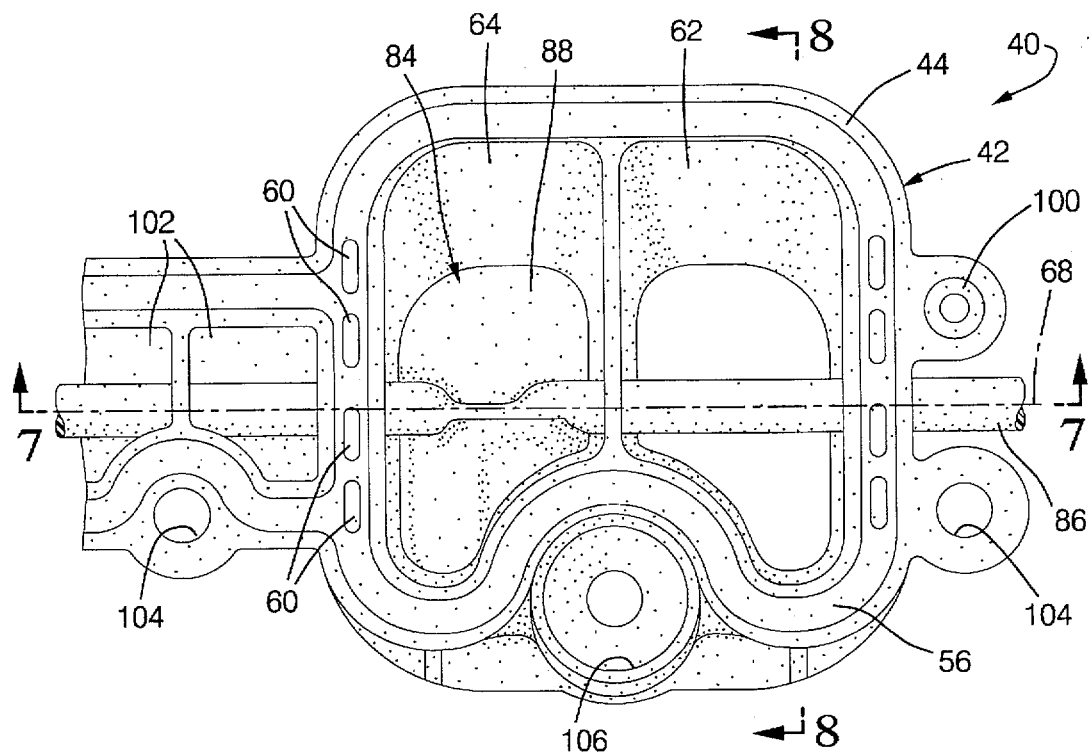
FIG. 6 is a plan view of a portion of the valve assembly of FIG. 3.
Figure 11:
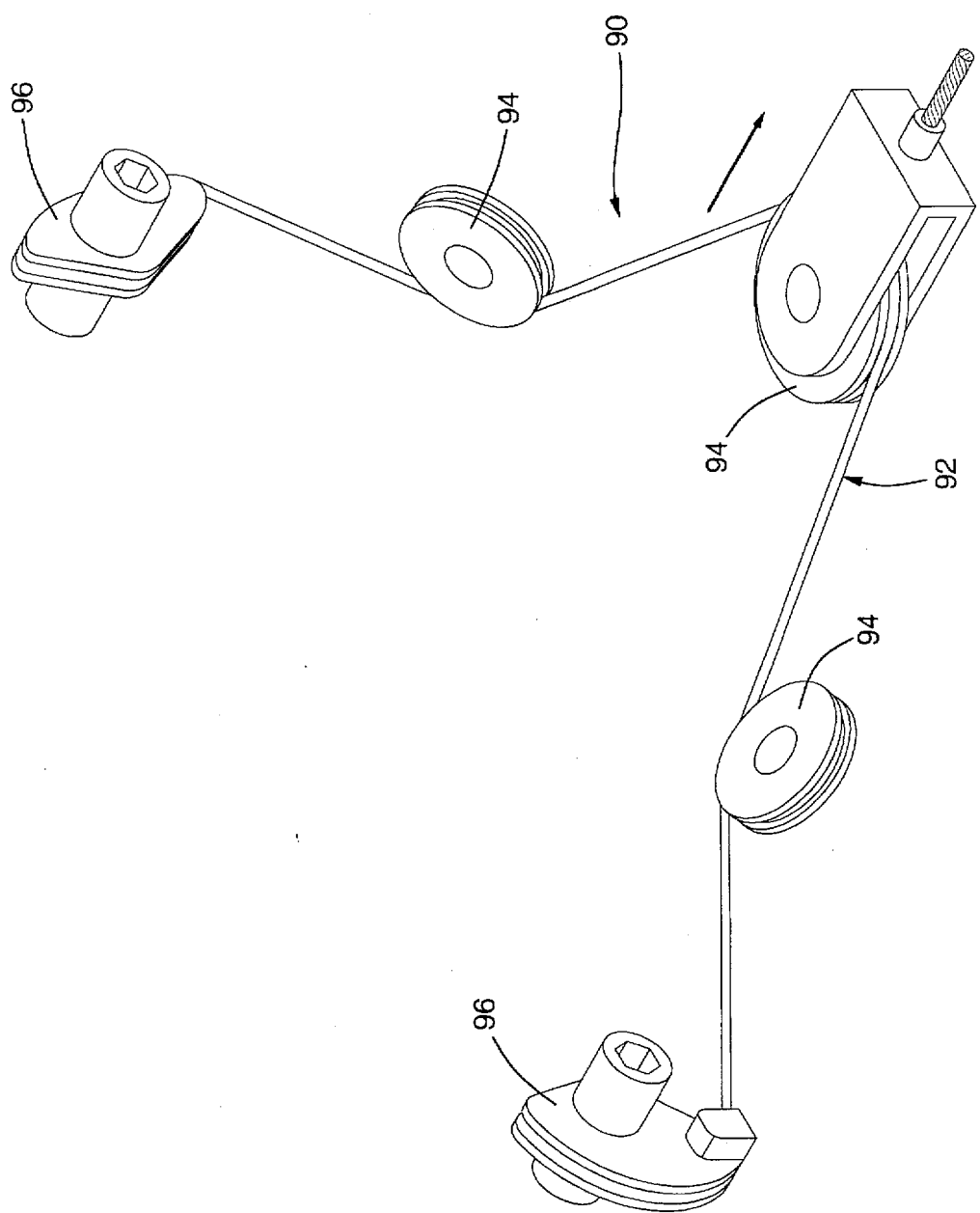
FIG. 11 is a schematic view of a valve activation assembly.

The intake system disclosed herein, includes a valve assembly 40 having two separate valve housings 42 which are disposed on a single side of the intake manifold 26 and which share a common valve shaft axis 68, as illustrated in FIGS. 2 and 3. Each housing 42 of valve assembly 40 includes two pairs of through passages 62 and 64 which supply combustion air to two engine cylinders 14. As such, the configuration shown in FIG. 3 is for an engine 10 having four in-line cylinders 14 each having two cylinder head intake ports 18 and 20, as would be the case in an in-line 4-cylinder engine or a v-configured 8-cylinder engine. In the case of an 8-cylinder engine, shown in FIG. 1, two banks of cylinders are supplied with intake air through two banks of associated pairs of outlet openings 34 and 36 which are axially disposed in spaced, array along the parallel sides of the intake manifold 86. Using a valve assembly having two separate valve housings 42 as shown in FIG. 4, minimizes the required length of the valve shaft 86 and allows the valve actuator assembly 90, which transfers opening torque to the valves 84, to act centrally on the valve assembly 40. The actuator assembly 90 may be driven by any suitable driver such as a vacuum solenoid or an electrical device which may be mounted to the valve housing 42. The actuator assembly 90, shown schematically in FIG. 11, is located remotely to the intake manifold and drives the valve assemblies on both sides of the engine 10 through a cable linkage 92 which extends under the intake manifold 26 and uses pulleys 94 to drive or rotate a spring loaded lever 96 which is fixed to the inner, driving ends 98 of the axially disposed and aligned valve housing 40.

The present invention is directed to a valve assembly for disposition between the intake runners of an intake manifold and the intake ports of a cylinder head to selectively regulate the flow of combustion air to the combustion chambers of an associated internal combustion engine. The valve assembly is uniquely constructed of a molded composite housing having through passages for the passage of combustion air. Within the housing and through passages is integrally molded a one-piece valve member which includes a rotatable shaft and associated valve blades. The valve shaft and blades have optimized dimensional tolerances relative to the housing as a result of the in-housing molding of the valve member. Shrinkage of the valve member is uniform and, as such, port-to-port variation in air flow is minimal.

The molded valve housing of the present invention allows the incorporation of features which would require additional machining steps in typical valve assemblies. Such features include molded-in seal grooves in the sealing surface with, if desired, molded in seals. In addition, fuel injector sockets 106, positioning features such as pegs 100 and openings 102 and through holes 104 for fasteners are easily incorporated. Through passages for combustion air may have complex, flow enhancing shapes due to the composite molding of the housing. The in-housing molding of the rotatable valve member allows the valve member to be molded in line contact with the through passage to assure sufficient dimensional accuracy and minimize disruption of flow through into the engine.

While the molding of the valve member into the valve housing is shown, in the present application, with respect to a valve for the selective control of air flow through paired inlet ports to a single cylinder of an internal combustion engine, it is contemplated that the features of the disclosed valve and the method of manufacturing same can have equally beneficial application in other valving applications such as throttle body valve assemblies which control the flow of combustion air into the intake system of an internal combustion engine. Throttle body assemblies generally are constructed in a similar manner and suffer from similar tolerance issues as the known valve assemblies.

The foregoing description of the preferred embodiments of the invention has been presented for the purpose of illustration and description. It is not intended to be exhaustive nor is it intended to limit the invention to the precise forms disclosed. It will be apparent to those skilled in the art that the disclosed embodiments may be modified in light of the above teachings. The embodiments described were chosen to provide an illustration of the principles of the invention and of its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

I claim:

1. A valve assembly for selectively controlling the air flow to a cylinder of an internal combustion engine comprising a molded composite housing having an upper sealing surface, a lower sealing surface, a combustion air through passage extending from said upper to said lower sealing surface and an axially extending, cylindrical valve bore defining an axis through said through passage and valve shaft bearing surfaces in said housing, said valve assembly further comprising a molded composite valve member having an axial valve shaft disposed in said valve bore and a valve plate, integral therewith, said valve member molded in said valve housing and rotatable in said valve bore to open and close said valve plate and regulate air flow therethrough.

2. A valve assembly, as defined in claims 1, said valve plate molded in line contact with said combustion air through passage of said valve housing to define minimum clearance between said valve plate and said housing.

3. A valve assembly, as defined in claim 1, said valve shaft having an annular sealing bead molded integrally therewith at the interface between said shaft and said housing wherein said bead defines an annular seal against said housing as said shaft shrinks following molding.

4. A valve assembly for selectively controlling air flow to a cylinder of an internal combustion engine comprising a molded composite housing having an upper sealing surface, a lower sealing surface, a plurality of combustion air through passages extending from said upper to said lower sealing surface and an axially extending valve bore defining an axis through said housing, said axis extending through said passages and said bore defining valve shaft bearing surfaces in said housing walls, said valve assembly further comprising a molded composite valve member having an axial valve shaft disposed in said valve bore and integral valve plates, disposed in predetermined through bores, said valve member molded in said valve housing and rotatable in said valve bore to open and close said valve plates for regulation of air flow through said predetermined through bores.

5. A combustion air intake system for an internal combustion engine having an intake manifold operable to supply intake air to said engine through pairs of differing length intake runners, said intake system further comprising a valve assembly, disposed between said intake runners and said engine, including a molded composite housing having an upper sealing surface, a lower sealing surface, a plurality of combustion air through passages, extending from said upper to said lower sealing surface, and an axially extending valve bore defining an axis through said housing, said axis extending through said passages and said bore defining valve shaft bearing surfaces in said housing walls, said valve assembly further comprising a molded composite valve member having an axial valve shaft, disposed in said valve bore, and integral valve plates, disposed in predetermined through bores, said valve member molded in said valve housing and rotatable in said valve bore to open and close said valve plates for regulation of air flow through said predetermined through bores.

6. A combustion air intake system for an internal combustion engine having an intake manifold operable to supply intake air to said engine through a plurality of pairs of differing length intake runners, said intake system further comprising a valve assembly, disposed between said intake runners and said engine, including a molded composite housing having an upper sealing surface, a lower sealing surface, a plurality of pairs of combustion air through passages, extending from said upper to said lower sealing surface, said pairs of through passages in flow communication with associate pairs of intake manifold through passages, and an axially extending valve bore defining an axis through said housing, said axis extending through said passages defining valve shaft bearing surfaces in said housing walls, said valve assembly further comprising a molded composite valve member having an axial valve shaft, disposed in said valve bore, and integral valve plates, disposed in predetermined through bores, said valve member molded in said valve housing and rotatable in said valve bore to open and close said valve plates for regulation of air flow through said predetermined through bores.

7. A method of manufacturing a valve assembly for selectively controlling the air flow to a cylinder of an internal combustion engine comprising the steps of:

molding a valve housing of composite material, said valve housing having upper and lower sealing surfaces, a through passage extending from said upper to said lower surface, and a longitudinally extending valve shaft bore defining an axis through said passage and valve shaft bearing surfaces in said housing walls, said through passage molded with a first die set removable along a first axis, and said valve shaft bore molded with a second die set removable along a second axis;

removing said first and second die sets from said molded valve housing and replacing said first and second die sets with a third die set for forming a valve member in said housing through passage;

molding said valve member in said housing and said third die set, said valve member comprising a valve shaft extending through said valve shaft bore and a valve plate, integral with said valve shaft and molded between said third die set and said valve housing through passage, in contact with said valve housing; and allowing said valve member to shrink and define a uniform operating clearance between said housing and said valve member.

* * * * *